US006910119B1

(12) United States Patent
Douglas

(10) Patent No.: US 6,910,119 B1
(45) Date of Patent: Jun. 21, 2005

(54) INSTRUCTION PIPE AND STALL THEREFOR TO ACCOMMODATE SHARED ACCESS TO RETURN STACK BUFFER

(75) Inventor: Jonathan P. Douglas, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 665 days.

(21) Appl. No.: 09/598,713

(22) Filed: Jun. 21, 2000

(51) Int. Cl.$^7$ ............................................. G06F 9/00
(52) U.S. Cl. ..................................... 712/216; 712/233
(58) Field of Search ................................ 712/216, 233, 712/242, 243; 711/147, 150

(56) References Cited

U.S. PATENT DOCUMENTS

| | | | | | |
|---|---|---|---|---|---|
| 4,394,729 | A | * | 7/1983 | Armstrong | 712/243 |
| 4,399,507 | A | * | 8/1983 | Cosgrove et al. | 712/219 |
| 5,222,220 | A | * | 6/1993 | Mehta | 714/38 |
| 5,515,519 | A | * | 5/1996 | Yoshioka et al. | 712/234 |
| 5,604,877 | A | * | 2/1997 | Hoyt et al. | 712/243 |
| 5,968,169 | A | * | 10/1999 | Pickett | 712/239 |
| 6,021,489 | A | * | 2/2000 | Poplingher | 712/239 |
| 6,151,671 | A | * | 11/2000 | D'Sa et al. | 712/239 |
| 6,170,998 | B1 | * | 1/2001 | Yamamoto et al. | 717/154 |
| 6,247,134 | B1 | * | 6/2001 | Sproch et al. | 713/320 |

OTHER PUBLICATIONS

IBM Technical Disclosure Bulletin NN9204269, "Return Address Stack Cache," Apr. 1992, pp. 269–271.*
Hennessy & Patterson, "Computer Architecture—A Quantitative Approach, 2nd Edition," 1996, p. 141.*
Hennessy & Patterson, Computer Architecture—A Quantitative Approach, 2nd Edition, 1996, pp. 134, 136, 139, 142–143, 152–154, 167, 276–277.*
Skadron et al., Improving Prediction for Procedure Returns with Return–Address–Stack Repair Mechanisms, 1998, pp. 259–271.*
Hennessy & Patterson, *Computer Architecture A Quantitative Approach*, Second Edition, Morgan Kaufmann Publishers, San Francisco California, Chapter 4, pp 271–278, 1996 (ISBN1–55860–372–7).

* cited by examiner

Primary Examiner—Eddie Chan
Assistant Examiner—David J Huisman
(74) Attorney, Agent, or Firm—Kenyon & Kenyon

(57) ABSTRACT

In a system where multiple instruction pipes share access to a common return stack buffer (RSB), coordination is provided to ensure that no instruction pipe gains unfair access to the RSB. Additionally, further coordination control may be provided to ensure that a pipe operates upon valid data notwithstanding communication delays that may be present in a communication path between the pipe and the RSB. In one embodiment, if a system must gain access to the RSB, it determines with reference to prior accesses to the RSB whether immediate access the RSB would exceed a predetermined access rate. If so, it delays its attempt to access the RSB until it re-synchronizes to the access rate. In another embodiment, it delays use of data from the RSB until communication delays are overcome.

5 Claims, 3 Drawing Sheets

100

300

US 6,910,119 B1

INSTRUCTION PIPE AND STALL THEREFOR TO ACCOMMODATE SHARED ACCESS TO RETURN STACK BUFFER

BACKGROUND

The present invention relates to a control mechanism for an instruction pipe in a processor that maintains timing synchronism between the instruction pipe and other elements outside the instruction pipe.

Execution logic in modern processors have begun to incorporate multiple instruction pipes. Each instruction pipe may include sufficient circuitry to execute most program instructions independently of the other pipes. Thus, a processor having multiple instruction pipes may perform nearly perfect parallel execution of program instructions.

It may not be desirable for instruction pipes to operate with complete independence from each other. For certain operations, greater efficiencies may be achieved by having the instruction pipes share access to other logic circuits. By way of example, it may be preferable for multiple instruction pipes to share a single Return Stack Buffer ("RSB"). As is known, an RSB is a buffer that stores forward and return pointers associated with call and return instructions. When a processor executes a call, it pushes an address associated with the call instruction to the RSB, typically the address of an instruction immediately following the call instruction, and begins execution at another program instruction at an address specified in the body of the call instruction. When a processor executes a return instruction, it retrieves an address from the top of the RSB and commences program execution at the retrieved address. Even in a processor having multiple instruction pipes, it may be more efficient to provide a single RSB for all instruction pipes rather than to provide a separate RSB for each of the instruction pipes. Because RSBs typically are not used every clock cycle, sharing the RSB improves utilization and reduces cost over a double-RSB design, for example.

In one implementation, an RSB may be provided within a first instruction pipe. Other instruction pipes in the processor may communicate with the RSB to store addresses therein for call instructions or to retrieve addresses therefrom for return instructions. However, this implementation raises a variety of timing problems.

A first timing problem arises because one RSB must be shared among a variety of instruction pipes. For N instruction pipes in a processor, each instruction pipe may enjoy utilization of the RSB reduced on a pro rata basis ($1/N^{th}$ of the RSB's total capacity). If an instruction pipe issues read or write requests to the RSB in excess of its pro rata share, the requests may be dropped. This would result in processor failure.

A second timing problem may arise due to round-trip communication latencies between an instruction pipe and the RSB. Requests must propagate from an instruction pipe to an RSB, be acted upon by the RSB and results therefrom must return to the instruction pipe. An instruction pipe that does not account for this round-trip latency during operation may act upon invalid data. Again, this would result in processor failure.

Accordingly, there is a need in the art for a timing control mechanism for use in instruction pipes to conform operation of the instruction pipe to timing limitations that may arise when interfacing the instruction pipe with external elements.

DETAILED DESCRIPTION

Embodiments of the present invention provide a clock throttling mechanism for a dual instruction pipe processor. In such an embodiment, an external element such as an RSB may be shared among a plurality of instruction pipes. The clock throttling mechanism of the present invention permits the instruction pipe to delay operation of its own elements to synchronize them with the outside element. Delay may be introduced for several reasons: to ensure that the processing of the instruction pipe does not exceed the pipe's access to the shared element, and to ensure that the instruction pipe always acts upon valid data from the shared element, even in the presence of significant round-trip communication latency between the instruction pipe and the shared element.

Figure 1:
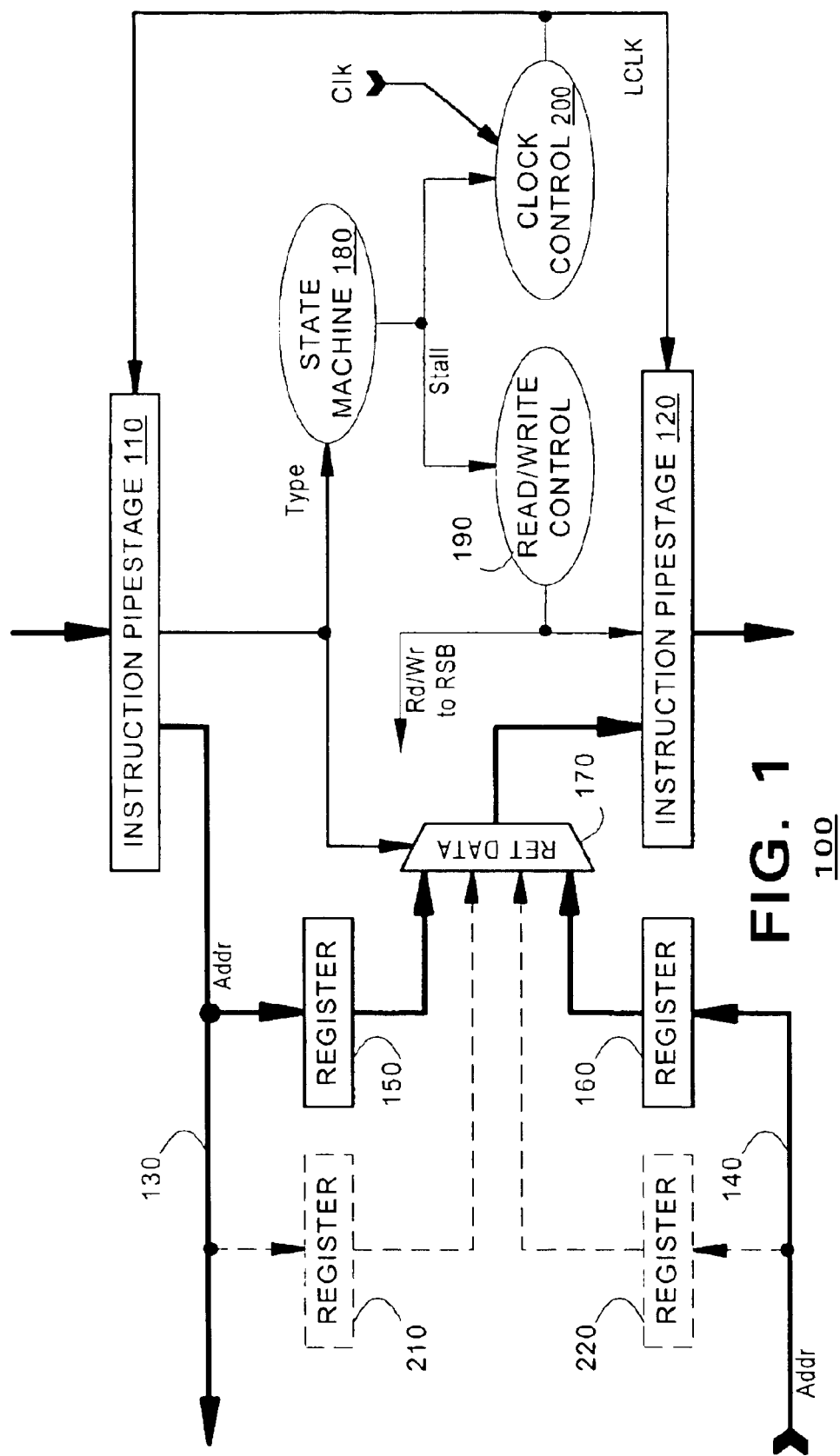
FIG. 1 is a block diagram of clock throttling logic according to an embodiment of the present invention.

FIG. 1 illustrates an instruction pipe 100 according to an embodiment of the present invention. Instruction pipes 100 may include a plurality of instruction pipestages 110, 120. As is known, pipestages 110, 120 store data associated with instructions being processed. As instruction data propagates through different pipestages of the instruction pipe 100, the data associated with the instruction may change. This manipulation of instruction data is part of the process of instruction execution.

Although FIG. 1 illustrates only a pair of instruction pipestages 110, 120, an instruction pipe 100 typically includes a cascaded chain of pipestages of a number that may be determined according to conventional design principles. The instruction pipe 100 may include interstitial logic that operates upon instruction data as it propagates through the multiple pipestages 110, 120. For the purposes of this discussion, it is sufficient to illustrate a pair of the pipestages 110, 120 and to explain elements that provide the clock throttling functionality of the embodiment. A pipestage may include additional logic in addition to that shown in FIG. 1 that provides other functionalities. Such additional logic is omitted from this discussion so as not to obscure operation of the clock throttling logic.

The logic shown in FIG. 1 may provide an interface between the pipestages 110, 120 of a first instruction pipe 100 and an RSB (not shown) provided disclosure within a processor. As is known, an RSB may store information relating to two specific types of program instruction: call instructions and return instructions. A call instruction may cause a processor to execute an identified segment of program code. Upon conclusion of the segment, the segment should terminate with a return instruction. The return instruction may cause the processor to return to the call instruction and resume execution with the instruction immediately following the call instruction.

Calls and returns may be nested within other calls and returns. That is, a processor may encounter a first call instruction that causes the processor to execute a first segment of code. The processor further may encounter a second call instruction that causes the processor to execute a second segment of code prior to conclusion of the first segment. The layered relationship of the calls and returns is highly efficient for program designers. In this regard, the characteristics of call and return instructions are well known.

According to this embodiment, when the first instruction pipestage 110 receives instruction information relating to a call instruction, it may store the following information relating to the instruction:

Instruction type—data identifying the instruction as a call instruction, instruction address—data identifying an address in an instruction cache from which the call instruction was read, target address—data identifying the instruction segment being called, an address in the instruction cache where the program should begin execution.

When the first instruction pipestage 110 receives instruction information relating to a return instruction, it may store data of an instruction type identifying the instruction as a return instruction. The data of a return instruction may change, however, as it propagates to the second pipestage 120. For example, a return address from the RSB or other source may be stored in the second pipestage. In the second pipestage, the data may include not only the instruction type, but also the address identifying the address in the instruction progression to which the processor should return. The second pipestage 120 may receive this address from the RSB.

The instruction pipe 100 may be provided in communication with an RSB (not shown) over communication lines 130, 140. A first set of communication lines 130 may provide an outbound communication link from the first pipestage 110 to the RSB. The first set of communication lines 130 also may be input to a first register 150.

A second set of communication lines 140 may provide an inbound communication link from the RSB to the second instruction pipestage 120 via a second register 160. Outputs of the first and second register 150, 160 each may be input to a selection multiplexer 170. An output of the selection multiplexer 170 may be input to the second pipestage 120.

In an embodiment, the instruction pipe 100 may include a state machine 180 that controls the clock throttling of the pipestage. The state machine 180 may control a read/write controller 190 that interfaces the instruction pipe 100 to the RSB (not shown) and also controls reading and writing of data to the second pipestage 120. The state machine 180 also may control a clock controller 200. The clock controller 200 may cause an input clock signal CLK to be throttled by disabling propagation of the clock signal under control of the state machine 180. In an embodiment, the clock controller 200 simply may be an AND gate.

Consider operation of the instruction pipe 100 in response to a call instruction. When a call instruction is read from the first instruction pipestage 110, the state machine 180 may decode the instruction type data from the first pipestage 110. Based upon the instruction type, the state machine 180 may cause the read/write controller 190 to issue a write command to the RSB. Address information from the first instruction pipestage 110 may be produced to the RSB over communication lines 130. The address information also may be written to the first register 150.

When a return instruction is read from the first instruction pipestage, again the state machine may decode the instruction based on its instruction type. Again the state machine 180 may control the read/write controller 190. For a return instruction, the read/write controller 190 requests an address to be read from the RSB. The address may be read into the second register 160 over the second communication lines 140.

According to an embodiment, an RSB may operate according to a "read-ahead" policy. The RSB may provide address data from the top of its stack in advance of being requested for the data. Accordingly, after the round-trip communication latency period passes from a previous call or return, the second register 160 should store address data associated with a return instruction at the top of the RSB stack. When the state machine 180 decodes a return instruction, it may cause data from the second register 160 to be read directly into the second instruction pipestage 120 without waiting for a response from the RSB to the read command issued by the read/write controller 190. When the RSB acts upon the read command from the read/write controller 190, the RSB may pop an address from the top of its stack, advances a new address to the top of the stack and pushes it to the second register 160 automatically. This configuration helps to maximize throughput of the instruction pipe.

In an embodiment, the first register 150 stores data associated with a most recent call instruction. According to this embodiment, even if program flow caused a call and a return to occur at a rate that overwhelms the RSB round-trip latency (within less than 5 clock cycles of each other), the return could proceed. The register 150 would store the address of the most recent call instruction. Thus, address information for the return instruction could be stored in the second pipestage. The addition of the first register 150 provides advantages in that it improves throughput of the instruction pipe and leads to a simpler state mechanism 180.

The first instruction pipestage 110 may receive data relating to an instruction to be processed. Instruction data may identify an instruction type. For different instruction types, the instruction data may differ. For a call instruction, in addition to an instruction type identifying the instruction as a "call," the instruction may include an address of an instruction that represents a return point from the call.

In an embodiment, the state machine 180 controls the multiplexer 170 to cause return data from one of the first or second registers 150, 160 to be stored in the second instruction pipestage 120.

Typically, within an instruction pipe 100, data of a single instruction propagates through one pipestage for each clock cycle. Thus, during operation, data may be read out of the first pipestage 110 at a first clock cycle. According to an embodiment, type information from the instruction may be input to the state machine 180. As described herein, the state machine may distinguish between call instructions, return instructions and all other instructions.

According to an embodiment, the state machine 180 may be adapted to conform the operation of the instruction pipe 100 to timing limitations of the RSB. Typical timing limitations include:

RSB availability. As noted, the RSB may be shared by several elements within a processor. Thus, there may be a predetermined limit to the frequency with which an instruction pipe may issue requests to the RSB. Requests issued in excess of this limit may be dropped by the RSB.

Communication latency from the instruction pipe to the RSB. As noted, the RSB may be provided in one instruction pipe and field requests from another instruction pipe. A physical separation between the RSB and the other instruction pipe may impose a predetermined round-trip communication latency to communications between them.

Different embodiments may generate different timing limitations. According to an embodiment, the different timing limitations may be predetermined and programmed into the state machine 180. Thus, the state machine may monitor instructions as they propagate from first pipestage 110 to the second pipestage 120. The state machine 180 may determine if a sequence of program instructions may occur that make it possible to create invalid data in the second pipestage 120. If so, the state machine 180 may throttle the clock in the instruction pipe 100 to suspend its operation until valid data is available.

According to an embodiment, the clock controller 200 may generate a local clock signal LCLK. The local clock LCLK may be input to the two pipestages 110, 120 and to every pipestage preceding the first pipestage 110 in the instruction pipe 100. There is no requirement that the local clock LCLK be input to any pipestages following the second pipestage 120. Thus, when the state machine 180 stalls the instruction pipe 100, it need only stall a portion of the instruction pipe 100 that precedes the stalled call or return instruction.

Figure 2:
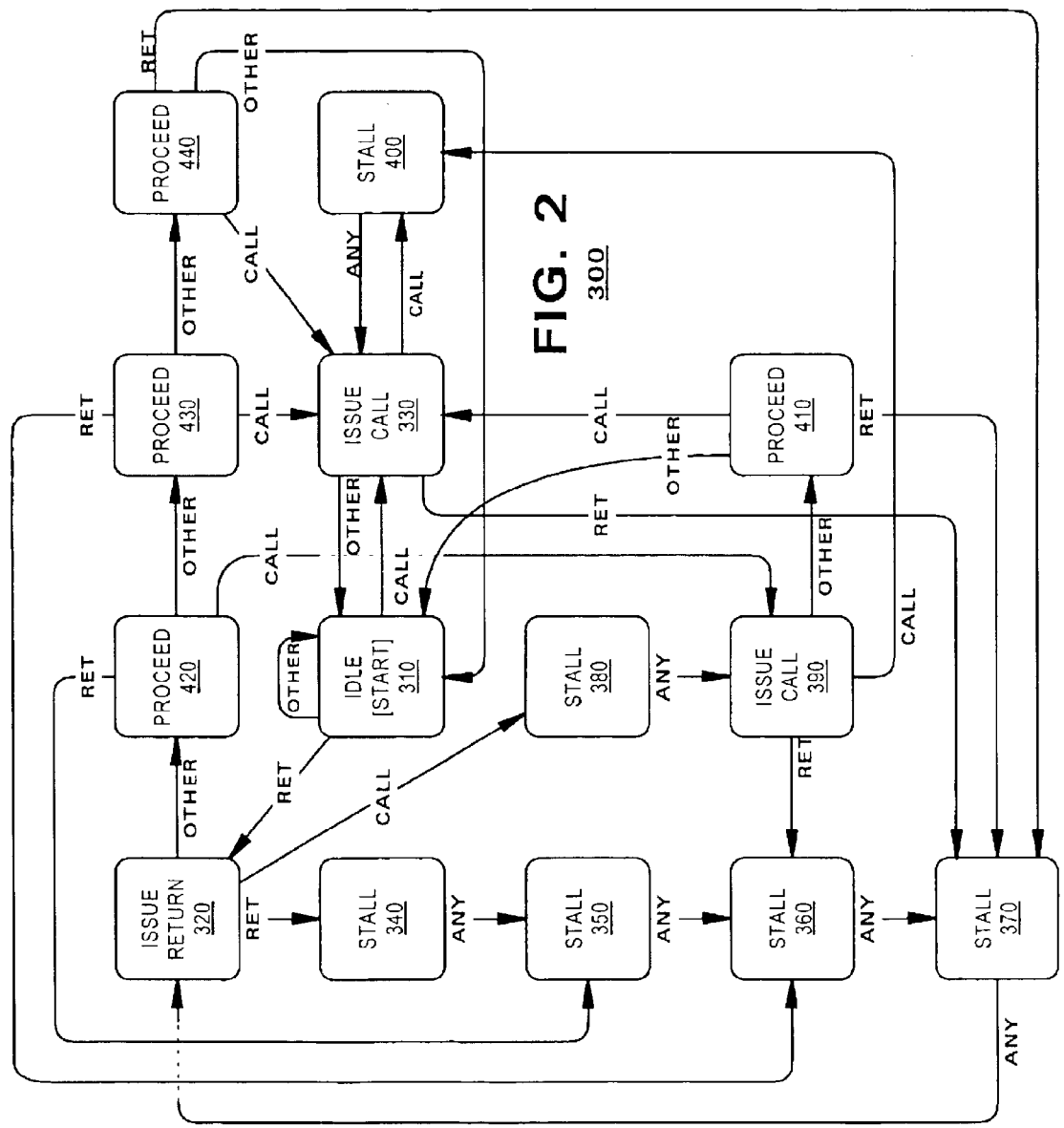
FIG. 2 is a state diagram illustrating operation of a state machine according to an embodiment of the present invention.

FIG. 2 illustrates operation of the state machine according to an embodiment of the present invention. To better illustrate the operation of the embodiment, FIG. 2 illustrates operation of a system using specific examples for the two timing limitations discussed above:

The instruction pipe may issue only one request to the RSB every two clock cycles.

Round-trip communication with the RSB takes five cycles.

Of course, the principles of the present invention find application with systems having other timing limitations.

The state diagram 300 of FIG. 2 illustrates several states 310–440 of operation for the state machine 180. The state machine 180 may transition among each of the various states once per cycle of the master clock signal CLK (FIG. 1). In FIG. 2, text provided adjacent to each of the arrows represents a condition that causes the state machine to advance from a first state to a second state.

At initialization, the state machine 180 may start in an idle state 310. As instructions propagate through the instruction pipe, the state machine 180 may classify instructions into three types for the purposes of clock throttling: a call instruction, a return instruction or an "other" instruction (not a call, not a return). The return instruction may cause the state machine to advance to a state 320 and issue the return. The call instruction may cause the state machine to advance to another state 330 and issue the call. Any other instruction may be processed according to normal procedures; the state machine 180 may remain at the idle state 310 for the purposes of clock throttling.

From state 320, the state machine 180 may classify an instruction as a return, a call or other. If a second return instruction occurs (back-to-back returns), the state machine 180 may begin a multi-clock stall, represented by states 340–370. Using the example of a 5 cycle round-trip communication delay, the clock stall would occur for 5 cycles. Again, other embodiments may be appropriate for different round-trip communication latencies. From state 320, the state machine 180 may progress in sequence through each of the stall states 340–370 regardless of the instructions that follow the second return. At the conclusion of the stall at state 370, the state machine returns to state 320 and issues the second of the back-to-back returns. Thereafter, the state machine determines the type of the instruction following the second return and processes this new instruction based on its instruction type.

From state 320, a next instruction may be a call instruction (a return, followed immediately by a call). In this case, the state machine 180 may advance to state 380 and stall the clock. Thereafter, the state machine may advance to state 390 and issue the call instruction. This single-cycle stall satisfies the timing limitation that requires sequential communications with the RSB to be separated by at least two cycles. In this case, although the call instruction arrives at the state machine 180 immediately after the return that preceded it, the call instruction will be delayed by a cycle to ensure that the communications with the RSB satisfy the 2 cycle timing limitation.

From state 390, the state machine 180 examines a next instruction from the first pipestage 110. Again, the instruction may be classified as a call, return or other. If the state machine 180 determines that the new instruction is a return, the state machine 180 may advance to state 360 and stall the instruction pipe. This response is appropriate because the instruction sequence (return-call-return) implicates both timing limitations. Without clock throttling, the instruction sequence would violate not only the 2 cycle limitation governing sequential communication with the RSB but also the 5 cycle limitation governing round-trip communications with the RSB. By advancing to state 360, the state machine will satisfy both timing limitations. It will wait another three cycles (states 360, 370, 320) before issuing the return instruction.

From state 390 the state machine may determine that the next instruction is a call instruction. In this case, the state machine may advance to state 400 and stall the clock for a single cycle. Thereafter, the state machine may advance to state 330 and issue the call instruction.

From state 390, the state machine may determine that the next instruction is neither a call nor a return. In this case, the state machine 180 may advance to state 410. The state machine 180 may permit the instruction to proceed. At state 410, the state machine processes a next instruction. For a call instruction, no timing requirements prevent the instruction from being issued, the state machine 180 may advance to state 330 and issue the call instruction. For an "other" instruction, the state machine may advance to the idle state 310. Execution of the "other" instruction will cause the state machine to be removed from the return issued at state 320 by the minimum five cycles; therefore, the state machine may return to the idle state.

If the state machine detects a return at state 410, the state machine may advance to state 370. The new instruction is part of a sequence, return-stall-call-other-return. Advancing from state 410 to state 370 is appropriate to ensure that the 5 cycle round-trip latency is maintained. Thus, the second return will be stalled for a clock cycle. Thereafter, the state machine may advance to state 320 and issue the return.

As noted, when the state machine is at the idle state 310 and detects a call instruction, it may advance to state 330 and issue the call. Thereafter, the state machine may classify a new instruction following the call. If the new instruction is itself a call instruction (back-to-back calls), the state machine may advance to state 400 and stall the new instruction. After the single-cycle stall, the state machine may return to state 330 and issue the second call.

If, at state 330, a next instruction is a return, the state machine may advance to state 370 and stall the instruction. Following state 370, the state machine may advance to state 320 and issue the return instruction.

From state 330, any instruction classified at "other" may cause the state machine to return to the idle state. The instruction may proceed.

From state 320, if the state machine classifies a new instruction as other, it may permit the new instruction to proceed (state 420). From state 420, a return instruction may cause the state machine to advance to state 350, an appropriate state in the multi-cycle stall that must be maintained for successive return instructions. From state 420, a call instruction may cause the state machine to advance to state 390. The call may be issued. From state 420, any other instruction may cause the state machine to advance to a state 430; the other instruction is permitted to proceed.

From state 430, a call instruction may cause the state machine to advance to state 330 and any other instruction may cause the state machine to advance to a state 440. No timing limitation prevents either the call instruction or other instruction from being processed. A return instruction, however, may cause the state machine to advance from state 430 to state 360. A remainder of the multi-cycle delay for successive returns must be completed prior to issuing the second return at state 320.

From state 440, a return instruction may cause the state machine 180 to advance to state 370 for a single-cycle stall. A call instruction, however, may be issued; the state machine, therefore, may advance to state 330. Any other instruction also may be issued; the state machine 180 thereafter returns to the idle state 310.

The principles of the present invention find application with other embodiments of instruction pipes such as those that independently process multiple code streams. In common operating systems, these multiple streams are called "threads". FIG. 1 illustrates in phantom a second pair of registers 210, 220 that may be used in a multi-stream instruction pipe. Register 210 may be provided in communication with the first communication path 130 and register 220 may be provided in communication with the second communication path 140.

In this embodiment, as instructions propagate through the instruction pipe 100, the instructions carry data identifying the stream to which the instruction belongs. Of the pair of registers 150, 210 connected to the first communication path 130, a first register 150 may store call addresses associated with one stream and a second register 210 may store similar addresses associated with another stream. So, too, with the registers 140, 220 connected to the second communication path 140. A first register 140 may store call addresses associated with the first stream and a second register 220 may store similar addresses associated with the second stream.

A multi-stream instruction pipe may operate under the same timing restraints as a "uni-stream" instruction pipe. Accordingly, operation of the state machine 180 need not change from the embodiments described above. However, as the state machine 180 controls the multiplexer 170 to read data from one of the registers 150–160, 210–220 to the second instruction pipestage 120, it performs its selection based not only on the timing of the instructions but also the stream from which the instruction originated.

Figure 3:
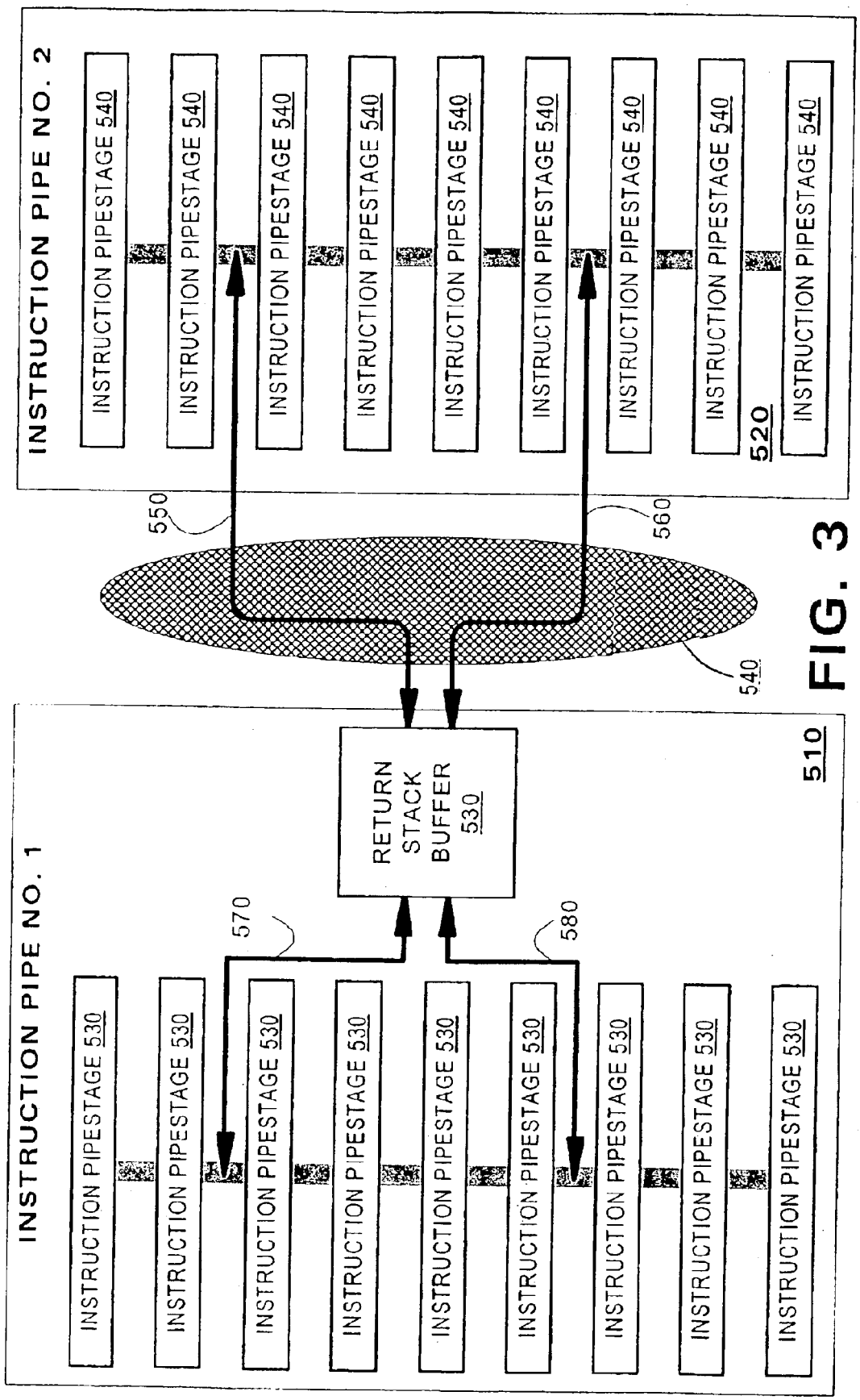
FIG. 3 is a block diagram illustrating a dual-pipe architecture for a processor.

FIG. 3 is a block diagram illustrating an execution unit of a processor having two instruction pipes 510, 520. The first instruction pipe 510 may include a first plurality of instruction pipestages 530 and the second instruction pipe 520 may include a second plurality of pipestages 540. Thus, the two instruction pipes 510, 520 provide for parallel execution of program instructions.

In the embodiment shown in FIG. 1, a first instruction pipe 510 includes an RSB 530. The second instruction pipe 520 is provided in communication with the RSB 530 via an interconnect 540. Thus, communication between the second instruction pipe 520 and the RSB 530 may be affected by any latency imposed by the interconnect 540.

According to an embodiment, an RSB 530 may communicate with multiple stages of a single instruction pipe. For example, the RSB 530 accepts two communication links 550, 560 from the second instruction pipe 520. In this embodiment, each communication link 550, 560 may be treated by the RSB 530 as a different entity. Thus, each portion of an instruction pipe may have access to the RSB 530 on a pro rata basis based on the number of communication links into the RSB 530 rather than just an absolute number of instruction pipes in the processor.

Although FIG. 3 illustrates the RSB provided within an instruction pipe 510, the principles of the present invention are not so limited. Thus, the present invention accommodates alternate embodiments such as those where the RSB 530 would be provided as a separate circuit independent from the first instruction pipe 510. In the alternate embodiment, communication links 570, 580 from the first instruction pipe 510 to the RSB 530 would pass through a second interconnect (not shown).

Several embodiments of the present invention are specifically illustrated and described herein. However, it will be appreciated that modifications and variations of the present invention are covered by the above teachings and within the purview of the appended claims without departing from the spirit and intended scope of the invention.

I claim:

1. An instruction pipe control method comprising:

reading a call instruction from an instruction pipestage, determining, with reference to other instructions read previously from the instruction pipestage, whether immediate processing of the call instruction would exceed a predetermined access rate of the instruction pipe to a return-stack buffer and, stalling processing of the call instruction until sufficient time has expired to synchronize processing of the call instruction with the predetermined access rate.

2. The method of claim 1, further comprising, after the stalling terminates, storing a return address associated with the call instruction both locally and in a shared resource.

3. The method of claim 1, wherein the stalling stalls the instruction pipestage and all other instruction pipestages before it in the instruction pipe.

4. An interface method for an instruction pipe that shares access to a return-stack buffer, comprising:

reading a call instruction from an instruction pipestage, determining with reference to other call and/or return instructions read previously from the instruction pipestage, whether immediate processing of the call instruction would cause the instruction pipe to exceed the instruction pipe's access allocation to the return-stack buffer, if so, stalling the call instruction, and after the stalling terminates, storing a return address associated with the call instruction both locally and in a shared resource.

5. The method of claim 4, wherein the stalling stalls the instruction pipestage and all other instruction pipestages before it in the instruction pipe.

* * * * *